(12) United States Patent
North et al.

(10) Patent No.: US 12,510,920 B2
(45) Date of Patent: Dec. 30, 2025

(54) MANAGING CLOCK TRIGGER SIGNALS FOR ASYNCHRONOUS CLOCK DOMAINS

(71) Applicant: TEXAS INSTRUMENTS INCORPORATED, Dallas, TX (US)

(72) Inventors: Gregory North, Austin, TX (US); Sudhakar Surendran, Bangalore (IN); Venkatraman Ramakrishnan, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 69 days.

(21) Appl. No.: 18/398,496

(22) Filed: Dec. 28, 2023

(65) Prior Publication Data

US 2024/0310868 A1 Sep. 19, 2024

Related U.S. Application Data

(60) Provisional application No. 63/490,563, filed on Mar. 16, 2023.

(51) Int. Cl.
  *G06F 1/08* (2006.01)
  *G06F 1/06* (2006.01)

(52) U.S. Cl.
  CPC . *G06F 1/06* (2013.01); *G06F 1/08* (2013.01)

(58) Field of Classification Search
  CPC .......................................................... G06F 1/08
  See application file for complete search history.

(56) References Cited

U.S. PATENT DOCUMENTS

| | | | | |
|---|---|---|---|---|
| 2007/0288818 | A1* | 12/2007 | Wang | G01R 31/31858 714/726 |
| 2014/0075257 | A1* | 3/2014 | Wang | G01R 31/318583 714/731 |
| 2017/0134031 | A1* | 5/2017 | Ezell | G06F 1/12 |
| 2021/0034095 | A1* | 2/2021 | Lele | G06F 1/04 |
| 2023/0106507 | A1* | 4/2023 | Onde | H04J 3/0685 375/356 |

* cited by examiner

*Primary Examiner* — Phil K Nguyen
(74) *Attorney, Agent, or Firm* — Xianghui Huang; Frank D. Cimino (57) ABSTRACT

Embodiments disclosed herein relate to managing clock signals across clock domains. In one implementation, a system is configured to derive a base clock signal from a first clock trigger signal produced by a first subsystem in a first clock domain of the clocking system. The system is further configured to generate a second clock trigger signal based on the base clock signal and a main clock of a second subsystem in a second clock domain of the clocking system. The system is also configured to supply the second clock trigger signal to a second peripheral in the second clock domain.

20 Claims, 6 Drawing Sheets

MANAGING CLOCK TRIGGER SIGNALS FOR ASYNCHRONOUS CLOCK DOMAINS

RELATED APPLICATIONS

This application hereby claims the benefit of and priority to U.S. Provisional Patent Application No. 63/490,563, titled "TICK CROSSING FOR ASYNC CLOCK DOMAIN", filed Mar. 16, 2023, and which is hereby incorporated by reference in its entirety.

TECHNICAL FIELD

The technology disclosed herein relates generally to computer hardware and devices, and specifically, to managing clock signals for devices.

BACKGROUND

Computing devices that utilize multiple clock frequencies, often referred to as heterogeneous or asymmetric multiprocessing systems, employ diverse clock speeds for different components within the same system. In these configurations, various processing units, such as CPUs, graphics processing units, and communication devices (such as universal asynchronous receiver-transmitters (UARTs)) and parts thereof, operate at distinct clock frequencies optimized for specific functions. This approach allows the system to balance performance and energy efficiency, as certain tasks may benefit from higher clock speeds while others can achieve sufficient performance at lower frequencies and reduced power. Further, some devices, such as communication devices, utilize specific frequencies to support a standard transmission requirement or BAUD rate.

However, while different circuits on a computing device may utilize different frequencies, difficulties arise with aspects of synchronizing activity such as minimizing jitter across the different circuits. The problem is compounded when the parts of the device can switch frequencies (i.e., from a low frequency to a high frequency) to support various functions. For example, a unit of a device can transition from a high frequency to a low frequency to preserve power resources of the device.

SUMMARY

Various embodiments disclosed herein relate to the management of clock trigger signals across multiple clock domains for a computing device. In one embodiment, a method of operating a clocking system includes deriving a base clock signal from a first clock trigger signal produced by a first subsystem in a first clock domain of the clocking system. The method further includes generating a second clock trigger signal based on the base clock signal and a main clock of a second subsystem in a second clock domain of the clocking system. The method also provides supplying the second clock trigger signal to a second peripheral in the second clock domain.

In another embodiment, a clocking system includes synchronizer circuitry configured to derive a base clock signal from a first clock trigger signal produced by a first subsystem in a first clock domain of the clocking system. The synchronizer circuitry is further configured to generate a second clock trigger signal based on the base clock signal and a main clock of a second subsystem in a second clock domain of the clocking system. The clocking system further includes control circuitry configured to supply the second clock trigger signal to a second peripheral in the second clock domain.

In a further embodiment, an integrated circuit includes first clocking circuitry configured to produce a first clock trigger signal in a first clock domain. The integrated circuit further includes second clocking circuitry configured to derive a base clock signal from the first clock trigger signal, generate a second clock trigger signal based on the base clock signal and a main clock of a second clock domain, and supply the second clock trigger signal to a second peripheral in the second clock domain.

This Summary is provided to introduce a selection of concepts in a simplified form that are further described below in the Detailed Description. It may be understood that this Summary is not intended to identify key features or essential features of the claimed subject matter, nor is it intended to be used to limit the scope of the claimed subject matter.

BRIEF DESCRIPTION OF THE DRAWINGS

The drawings are not necessarily drawn to scale. In the drawings, like reference numerals designate corresponding parts throughout the several views. In some embodiments, components or operations may be separated into different blocks or may be combined into a single block.

DETAILED DESCRIPTION

Embodiments of the present disclosure are directed at the management of clock trigger signals across multiple clock domains to be provided to peripherals and systems of a computing device. A clock domain in digital circuitry refers to a group of sequential elements, such as flip-flops or registers, that share the same clock signal. The clock signal acts as a periodic reference that dictates when these elements should capture, transfer, or store data. The purpose of dividing a digital system into clock domains is to manage the timing relationships between different parts of the system. Each clock domain operates independently with its own clock signal, and the elements within a domain are synchronized to that clock. This organization helps ensure the orderly progression of signals within each domain and facilitates the overall synchronization of a digital system.

Here, a first clock signal is propagated from a first clock domain (first subsystem) to a second clock domain (second subsystem) along with a first clock trigger signal. The clock trigger signal is used to operate at a lower frequency by indicating edges or periods of the first clock signal that are relevant to one or more peripherals. For example, while an example clock signal operates at 32 MHZ, a peripheral in the first clock domain may operate at a clock frequency of 4 MHZ. Accordingly, the clock trigger signal is used by the peripheral to transition (e.g., latch and/or launch data) on every eighth clock pulse of the 32 MHZ clock, thus causing at least part of the peripheral to operate at 4 MHZ. Advantageously, this permits a peripheral to operate at a different frequency than the frequency provided by the 32 MHZ clock signal, while maintaining synchronization with the 32 MHZ clock signal. The clock signal is generated by an oscillator which is an electronic circuit or device that generates a periodic, repetitive waveform, often in the form of a sine, square, or triangle wave. This waveform is generated at a specific frequency and is used as a reference or clock signal in various electronic systems. The peripheral can comprise a processing system, a communication system, such as a I2C device or universal asynchronous receiver-transmitter (UART), or some other peripheral on the computing device.

In the second clock domain, circuitry determines whether to use the first clock signal provided from the first clock domain or a second clock signal that is available in the second clock domain. The second clock signal can be synchronous with the first clock signal or can be asynchronous to the first clock signal. Synchronous clocks maintain consistent and coordinated time intervals by using a common reference signal and thus may have some rising and/or falling edges that occur at substantially the same time. Asynchronous clocks operate independently without a common reference signal. For example, the first clock signal can operate at 15 MHZ, while the second clock signal operates at 32 MHZ without any rising and/or falling edges occurring at substantially the same time other than by chance.

In at least one implementation, the system uses a multiplexer (MUX) to select a desired clock signal from the first clock signal or the second clock signal. The MUX selects the clock signal based on the desired frequency for the second clock domain. In some examples, the MUX represents a glitchless MUX. A glitchless mux is a multiplexer design in digital electronics that aims to prevent momentary undesired output pulses (glitches) during the switching of input data lines such as clocks. This may be achieved through techniques such as synchronous timing, the use of storage elements, and signal conditioning to ensure a clean and stable output signal. The clock selected for the second clock domain is referred to as the main clock for that domain in some embodiments. For example, the first clock signal from the first clock domain provides a first frequency that is slower than the second clock signal available in the second clock domain (which may not be available in the first clock domain). The faster frequency is selected for the main clock during first conditions (e.g., high demand for processing or compute resources) and the slower frequency is selected for the main clock during other conditions and used to conserve power.

To support the propagation of the first clock trigger signal from the first clock domain to the peripherals in the second clock domain, circuitry is included that generates a second clock trigger signal based on the selected frequency of the first frequency or the second frequency. In at least one embodiment, circuitry in the second clock domain derives a base clock signal from the first clock trigger signal produced by the first subsystem in the first clock domain. In some implementations, the base clock signal represents a 50-50 duty cycle signal derived from the first clock trigger signal. A 50-50 duty cycle signal is a periodic waveform, typically a square wave, where the duration of the signal's high state (ON) is equal to the duration of its low state (OFF), resulting in an equal division of time between the two states. Thus, the base clock signal may have the same period as the first clock trigger signal, but whereas the first clock trigger may be active for less than half of the period, the base clock signal may spend an equal amount of time in its active and inactive states, representing a balanced and symmetrical waveform.

As an example, if the first clock trigger signal corresponds to every eight periods of the first clock signal (i.e., in a high state for one period out of every eight for the first clock signal), the base clock signal or would be high for four periods of the first clock signal and be low for the next four periods of the first clock signal. From the base clock signal, the circuitry of the second clock domain identifies when the base clock signal transitions to a high state from the low state. In response to the transition from the low state to the high state, the circuitry identifies a start of a new period in the main clock selected and output by the MUX (i.e., leading edge of a new period) and transitions the second clock trigger signal from a low state to a high state for a period of the main clock. Once the period is completed, the second clock trigger signal transitions to the low state and the process is repeated with identifying the next change of the base clock signal from a low state to a high state. Although demonstrated in the previous example using a 50-50 duty cycle base clock signal, any sufficient duty cycle signal can be employed that can generate or pulse the second clock trigger signal for at least one period, wherein the duty cycle signal or clock is derived from the first clock trigger signal. For example, the base clock signal can represent a 25-75 duty cycle derived from the first clock trigger signal where the signal is active (high) for 25% of the time and inactive (low) for the remaining 75% percent of the time in each cycle. Similar operations are employed by the circuitry of the second clock domain to identify when the base clock signal transitions from a low state to a high state. In response to identifying the transition of the base clock signal from the low state to the high state, the circuitry of the second clock domain further identifies a start of a new period in the main clock selected and output by the MUX (i.e., leading edge of a new period) and transitions the second clock trigger signal from a low state to a high state for a period of the main clock. The base clock signal has a duty cycle of sufficient duration to pulse the second clock trigger signal for at least one period of the main clock.

Advantageously, by using the base clock signal, the timing and duration of the pulses associated with the second clock trigger signal are adjusted based on the frequency selected for the main clock. When the main clock is the higher frequency, the circuitry in the second clock domain generates a shorter pulse of the second clock trigger signal corresponding to the period of the high frequency clock. Alternatively, when the main clock is the lower frequency, the circuitry in the second clock domain generates a longer pulse the second clock trigger signal corresponding to the period of the lower frequency clock. In some implementations, the lower frequency clock signal is provided by the first clock domain and first circuitry associated with the first clock domain. The high frequency clock signal is introduced in the second clock domain and is not provided from the first clock domain.

The second clock trigger signal is provided to one or more peripherals within the second clock domain or elsewhere that can use the second clock trigger signal along with the main clock to provide the desired operation. The peripherals comprise communication peripherals (UARTs, I2C devices, serial peripheral interface (SPI) devices, and the like), sensors, or some other devices that operate at a frequency different from the main clock. Additionally, the second clock trigger signal is synchronous to the main clock but derived from the first clock trigger signal of the first subsystem with minimal jitter.

In some implementations, the first clock trigger signal is provided to one or more peripherals that use the first clock trigger signal with the first clock signal (i.e., clock for the first clock domain and first subsystem). These peripherals represent communication devices, sensors, or some other peripherals on the device that operate in the first time domain and are separate from the second time domain. The different time domains are used to separate systems and elements that can operate asynchronously or on different clocks for the device.

Figure 1:
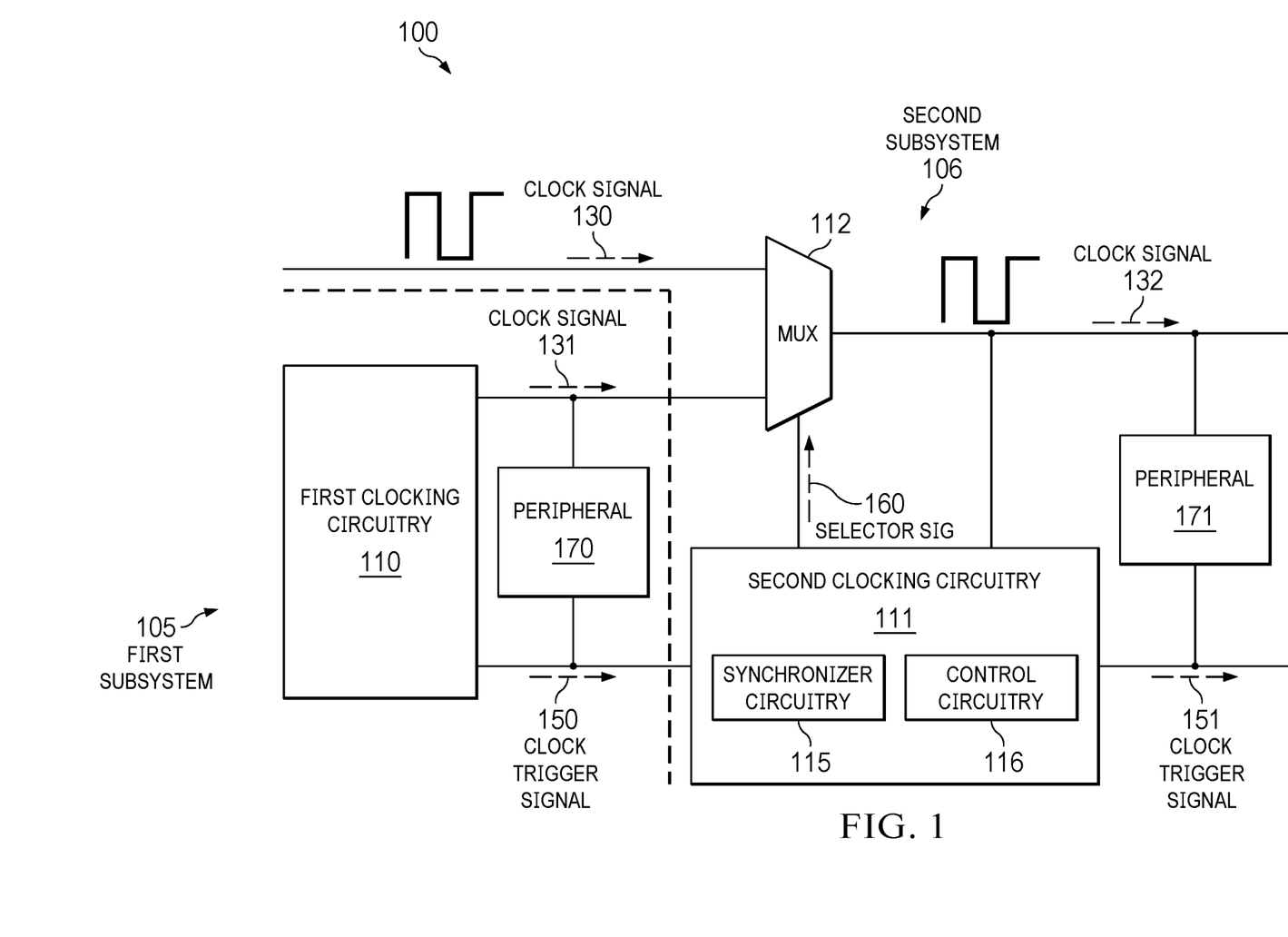
FIG. 1 illustrates a system to manage clock trigger signals across clock domains for a device according to an implementation.

FIG. 1 illustrates a system 100 to manage clock trigger signals across clock domains for a device according to an implementation. System 100 includes first subsystem 105 representative of a first clock domain and second subsystem 106 representative of a second clock domain. First subsystem 105 includes first clocking circuitry 110 that provides clock signal 131 and clock trigger signal 150. Second subsystem 106 includes MUX 112, clock signal 130, clock signal 132, selector signal 160, second clocking circuitry 111, and clock trigger signal 151. Second clocking circuitry 111 further includes synchronizer circuitry 115 and control circuitry 116. Clock signals 130-131 represent synchronous or asynchronous clocks. In some examples, clock signal 130 represents a signal with a frequency that is at least twice that of clock signal 131. System 100 further includes peripherals 160-161. Peripheral 170 operates based on clock signal 131 and clock trigger signal 150. Peripheral 171 operates based on clock signal 132 and clock trigger signal 151.

In system 100, first clocking circuitry 110 produces clock signal 131 and clock trigger signal 150. First clocking circuitry 110 includes a variety of components such as resistors, capacitors, inductors, transistors, registers, logic gates, integrated circuits, and wiring, as well as the arrangement and configuration of these elements. Clock signal 131 is generated from an oscillator that produces a square wave at a first frequency. For example, clock signal 131 represents a square wave at a first frequency (e.g., 16 MHZ). In addition to clock signal 131, first clocking circuitry 110 further generates clock trigger signal 150 that is used by peripherals to determine when to transition according to rising and/or falling edges of associated with clock signal 131. For example, clock trigger signal 150 will be in a high state for one out of every four periods, if the desired frequency for clock trigger signal is one fourth the frequency of clock signal 131.

From first clocking circuitry 110, clock signal 131 is provided to MUX 112 which is a device or circuit that takes clock signal 130 and clock signal 131 and selects one of the clock signals to be output as clock signal 132. Clock signal 130 is provided to or generated in second subsystem 106 and the second clock domain and provides a different frequency than clock signal 131. In some implementations, clock signal 130 represents a frequency that is higher than clock signal 131 provided from first subsystem 105. When selecting a frequency from clock signals 130-131, MUX 112 uses selector signal 160 that indicates whether to generate clock signal 132 based on clock signal 130 or clock signal 131. Selector signal 160 indicates a desired frequency based on the compute requirements, based on power requirements, and/or based on some other factor. In some examples, selector signal 160 is provided from a processing system (not pictured). In some examples, MUX 112 is a glitchless MUX to prevent momentary undesired output pulses (glitches) during the switching of input data lines, namely switching from generating clock signal 132 based on clock signal 130 to being based on clock signal 131 and vice-versa. This may be achieved through techniques such as synchronous timing, the use of storage elements, and signal conditioning to ensure a clean and stable output signal.

Synchronizer circuitry 115 of second clocking circuitry 111 receives clock trigger signal 150 from first clocking circuitry 110. Second clocking circuitry 111 includes a variety of components such as resistors, capacitors, inductors, transistors, registers, logic gates, integrated circuits, and wiring, as well as the arrangement and configuration of these elements. Synchronizer circuitry 115 derives a base clock signal from clock trigger signal 150. The base clock signal represents a 50-50 duty cycle wave generated from clock trigger signal 150, which may have the same period as the clock trigger signal 150 and may have at least one rising and/or falling edge that occurs at substantially the same time as an edge of the clock trigger signal 150. The base clock signal can comprise a modified duty cycle of clock trigger signal 150, wherein the duty cycle clock maintains the positive edge frequency of clock trigger signal. However, the base clock signal may remain in a high state for a duration sufficient to support the sampling with the main clock or clock signal 132.

Once the base clock signal is generated, synchronizer circuitry 115 generates clock trigger signal 151 based on the base clock signal and clock signal 132. In at least one implementation, synchronizer circuitry 115 identifies a positive edge in the base clock signal. In response to identifying the edge, synchronizer circuitry 115 identifies the next positive edge in clock signal 132 and changes clock trigger signal 151 from a low state to a high state for one period of clock signal 132. Once the period is complete, synchronizer circuitry 115 changes clock trigger signal 151 from the high state to the low state and monitors for the next positive edge of the base clock signal to repeat the steps.

Control circuitry 116 supplies clock trigger signal 151 to peripheral devices of second subsystem 106 and the second clock domain. The peripheral devices comprise communication devices, sensors, or other devices that use clock trigger signal 151 (and clock signal 151) to obtain a desired frequency. In some implementations, clock trigger signal 150 is coupled to other peripherals in the first clock domain to provide similar operations.

Figure 2:
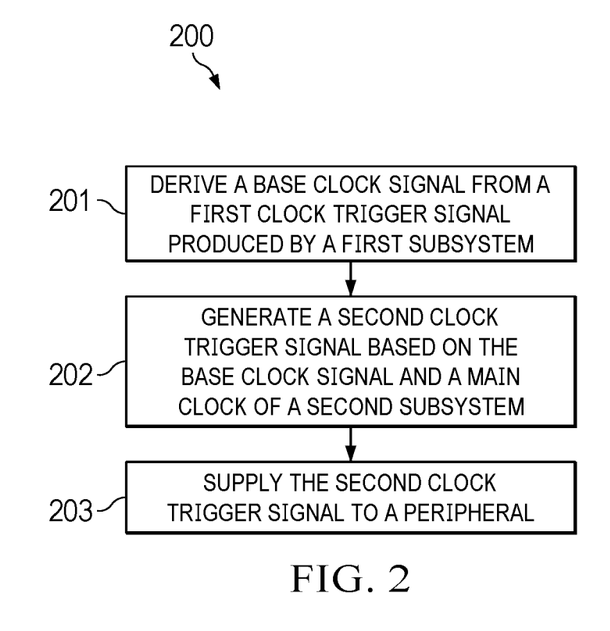
FIG. 2 illustrates an operation of a system to manage clock trigger signals across clock domains for a device according to an implementation.

FIG. 2 illustrates an operation 200 of a system to manage clock trigger signals across clock domains for a device according to an implementation. The steps of operation 200 are referenced parenthetically in the paragraphs that follow with reference to systems and elements of system 100 from FIG. 1. Specifically, the steps of operation 200 are performed by a combination of synchronizer circuitry 115 and control circuitry 116 of second clocking circuitry 111.

Operation 200 includes deriving (201) a base clock signal from a first clock trigger signal produced by a first subsystem in a first clock domain of the clocking system. In some examples, the base clock signal is representative of 50-50 duty cycle wave generated from the first clock trigger signal. The first clock trigger signal notifies a peripheral or other systems on a device to respond (e.g., latch and/or launch data) based on an edge of a first clock signal. For example, the first clock trigger signal can cause a peripheral to accept every eighth period of the first clock signal by transitioning from a low to a high state. Once the clock signal is operated on by the peripheral, or the eighth pulse is provided to the peripheral, the first clock trigger signal is returned to the low state. Accordingly, the first clock trigger signal is high for one out of every eight periods of the first clock signal. Synchronizer circuitry 115 generates the base clock signal or 50-50 duty cycle signal having the same period as clock trigger signal 150. Using an example of every eighth period of clock signal 131 corresponding to clock trigger signal 150 being in a high state, synchronizer circuitry 115 generates a base clock signal that is high for four periods of clock signal 131 and low for four periods of clock signal 131.

Once the base clock signal is generated, operation 200 further generates (202) a second clock trigger signal based on the base clock signal and a main clock of a second subsystem in a second clock domain of the clocking system. As demonstrated in system 100, MUX 112 is used to provide clock signal 132 (i.e., main clock) that is a selection from clock signal 130 and clock signal 131. In at least one implementation, clock signal 130 is at a first frequency that is higher than the frequency of clock signal 131. MUX 112 selects a clock signal based on an operating mode of the system and provides the selected clock signal as clock signal 132. For example, clock signal 130 represents a clock at 40 MHZ and clock signal 131 represents a clock at 20 MHZ. The selection of the clock is based on selector signal 160 from second clocking circuitry 111 and is based on the operating mode of system 100. In some embodiments, the frequency selection is based on processor requirements on the system (i.e., compute requirements), based on power requirements in the system, or based on some other factor. The request is generated by a processor of the computing system in some examples and communicated to MUX 112 using second clocking circuitry 111.

Synchronizer circuitry 115 identifies when the base clock signal transitions to a high state and in response to the base clock signal transitioning to a high state, identifies a start of a new period for clock signal 132. In response to identifying the start of a new period, synchronizer circuitry 115 transitions clock trigger signal 151 to a high state for a period of clock signal 132 (can be more than one period in some examples, such as one and a half periods). At the end of the period (i.e., the next positive edge of clock signal 132), clock trigger signal 151 is returned to the low state. The operation is repeated at the next occurrence that the base clock signal transitions to a high state. In this manner, the base clock signal provides a duty cycle ratio sufficient for producing the second clock trigger signal by sampling the base clock signal at the main clock. Advantageously, the occurrence and duration that clock trigger signal 151 is in the high state changes when the frequency of clock signal 132 changes. When clock signal 132 is the frequency of clock signal 130 (i.e., higher frequency), synchronizer circuitry 115 generates a shorter pulse corresponding to the period of the high frequency clock. Alternatively, when clock signal 132 is the frequency of clock signal 131 (i.e., lower frequency), synchronizer circuitry 115 generates a longer pulse corresponding to the period of the lower frequency clock.

Operation 200 further provides for supplying (203) the second clock trigger signal to a second peripheral in the second clock domain. The peripheral represents a sensor, a processing system, a communication device, such as a UART, 12C device, SPI device, or some other communication device, or some other peripheral device. Second subsystem 106 can also provide the peripheral with clock signal 132. In some implementations, clock trigger signal 151 provides clock trigger signal 151 to the destination peripheral device. The clock trigger signal is used to indicate and provide the appropriate frequency to the individual peripheral devices. Additionally, clock trigger signal 151 permits the addition and potential use of clock signal 130 in the second clock domain and second subsystem 106 while maintaining synchronicity in the frequencies provided to the various peripherals. The synchronicity is based on the base clock signal, or 50-50 duty cycle derived from clock trigger signal 150.

Figure 3:
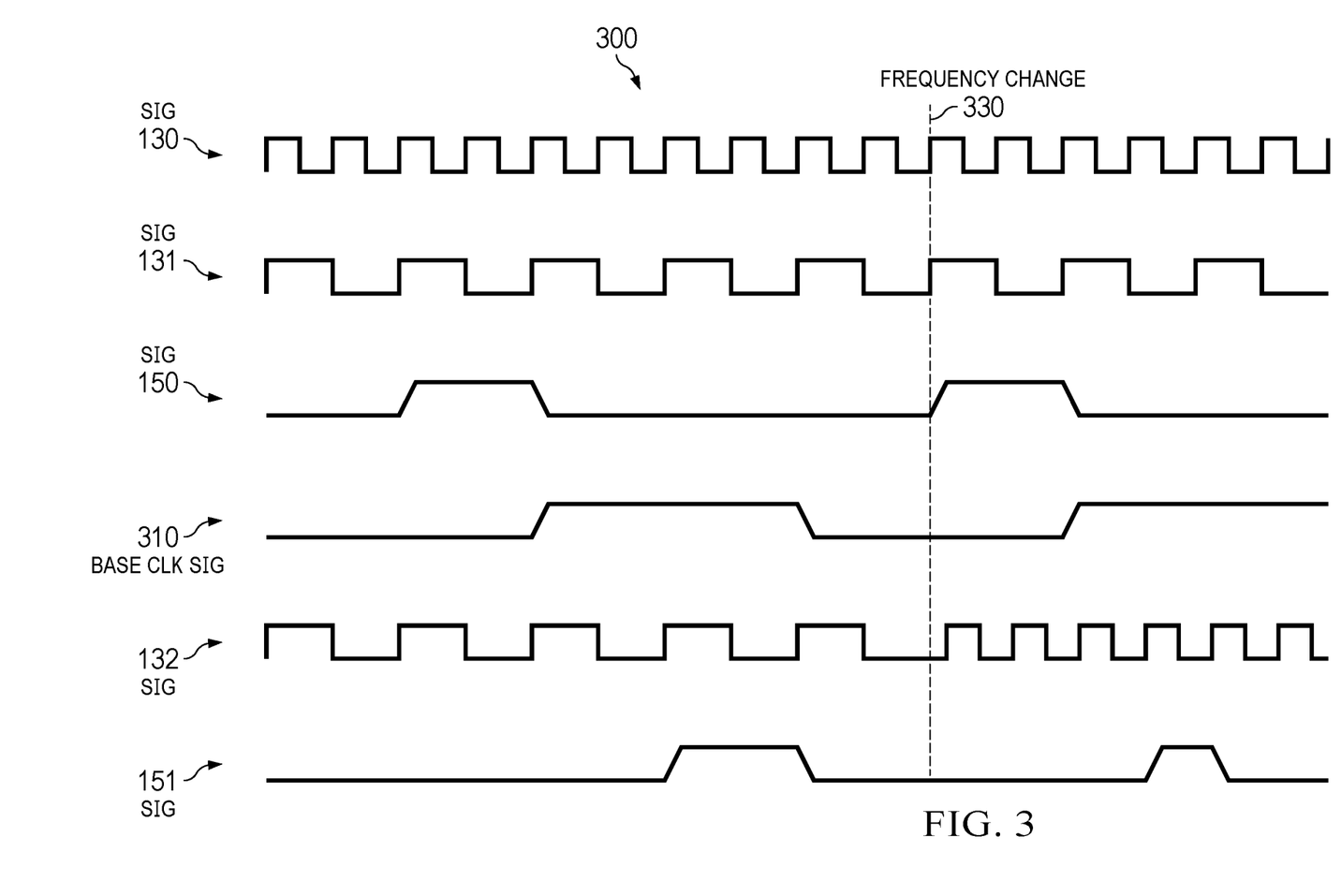
FIG. 3 illustrates a timing diagram of managing clock trigger signals across clock domains for a device according to an implementation.

FIG. 3 illustrates a timing diagram 300 of managing clock trigger signals across clock domains for a device according to an implementation. Timing diagram 300 includes clock signal 130, clock signal 131, clock trigger signal 150, clock signal 132, and clock trigger signal 151 from system 100 of FIG. 1. Timing diagram 300 further includes frequency change 330 and base clock signal 310 that is representative of a base clock signal from clock trigger signal 150.

In timing diagram 300, clock signals 130-131 are at different frequencies that are each capable of selection by MUX 112. Clock signal 130 is twice the frequency of clock signal 131 and either clock signal is selectable by the MUX based on an operating mode of the computing device. For example, clock signal 130 is selected when compute resources are in greater demand. Alternatively, clock signal 131 is selected when the device is in a lower power state. Clock signal 131 is provided by first clocking circuitry in the first time domain and is further provided to one or more peripherals associated with the first time domain. The peripherals comprise sensors, communication peripherals, processors, or some other peripheral available in the first time domain. Clock signal 130 is representative of a clock signal that is available to the second time domain but need not be present in the first time domain. In some implementations, clock signal 130 is representative of high-speed clock provided by an oscillator that can be made available to peripherals or other systems in the second time domain when required. The oscillator is an electronic circuit or device that produces a repetitive and periodic waveform, typically a sine wave, square wave, or sawtooth wave. Clock signal 131 is also produced via an oscillator in the circuitry associated with the first time domain.

Here, clock trigger signal 150 is representative of a signal that is high for one period of clock signal 131 every fourth period of clock signal 131. Clock trigger signal 150 is used to provide desired clock pulses to various peripherals within the first time domain, such as communication devices (UARTs), 12C devices, or some other device. Clock trigger signal 150, when in the high state, causes the peripheral device to respond to an edge of the clock signal 131. Specifically, in the example of timing diagram 300, every fourth period of clock signal 131 is responded to by the peripheral device.

From clock trigger signal 150, base clock signal 310 is generated that represents a base clock signal for maintaining synchronicity for clock trigger signal 151. Base clock signal 310 is representative of a 50-50 duty cycle wave that is produced from clock trigger signal 150. A 50-50 duty cycle wave, often associated with a square wave, has equal durations for its high and low states, resulting in a waveform where the signal spends an equal amount of time in both states. In other words, the signal's high and low levels are each present for 50% of the total period, creating a symmetrical square-shaped waveform. Base clock signal 310 is high for two periods of clock signal 130 and low for two periods of clock signal 130. Base clock signal 310 is generated by circuitry, such as registers, gates, or other logic that produce the desired duty cycle wave.

From base clock signal 310 and clock signal 132, clock trigger signal 151 is generated via the second clocking circuitry in the second clock domain. The second clocking circuitry identifies a positive edge associated with base clock signal 310. In response to the positive edge, the second clocking circuitry identifies the start of the next period for clock signal 132 (e.g., a rising and/or falling edge of clock signal 132) and transitions clock trigger signal 151 from a low state to a high state for the duration of one period of clock signal 132. Once the period expires, the second clocking circuitry returns clock trigger signal 151 to a low state.

In the example of timing diagram 300, the frequency selected by the MUX in the second time domain is changed at frequency change 330. The frequency change occurs in response to a power request of a processing system on the computing device, in response to a selection from a sensor, or based on some other factor. In at least one implementation, the second clocking circuitry communicates the request based on when the change is available (e.g., low state of base clock signal 310). After the change in frequency for clock signal 132, the second clocking circuitry identifies a second positive edge associated with base clock signal 310. In response to the positive edge, the second clocking circuitry identifies the next period of clock signal 132 and raises clock trigger signal 151 from a low state to a high state for the duration of the period. Once the period expires, the second clocking circuitry returns clock trigger signal 151 to a low state. Clock trigger signal 151 is provided to one or more peripherals to support a desired clock frequency for the peripherals.

Although demonstrated in the examples of FIG. 1-3 using a 50-50 duty cycle base clock signal as the base clock signal, the second clocking circuitry can use any sufficient duty cycle that triggers a required pulse of second clock trigger signal 151. Any duty cycle with a sufficient active (high) length to trigger the pulse of the second clock trigger signal 151 from second clock signal 132 can be used. In at least one implementation, the duty cycle ratio is sufficient for producing the second clock trigger signal by sampling the base clock signal at the main clock. Specifically, the duty cycle ratio is sufficient for the base clock signal to transition to a high state and permit the second clocking circuitry to transition signal 151 to a high state for at least one period of signal 132.

Figure 4:
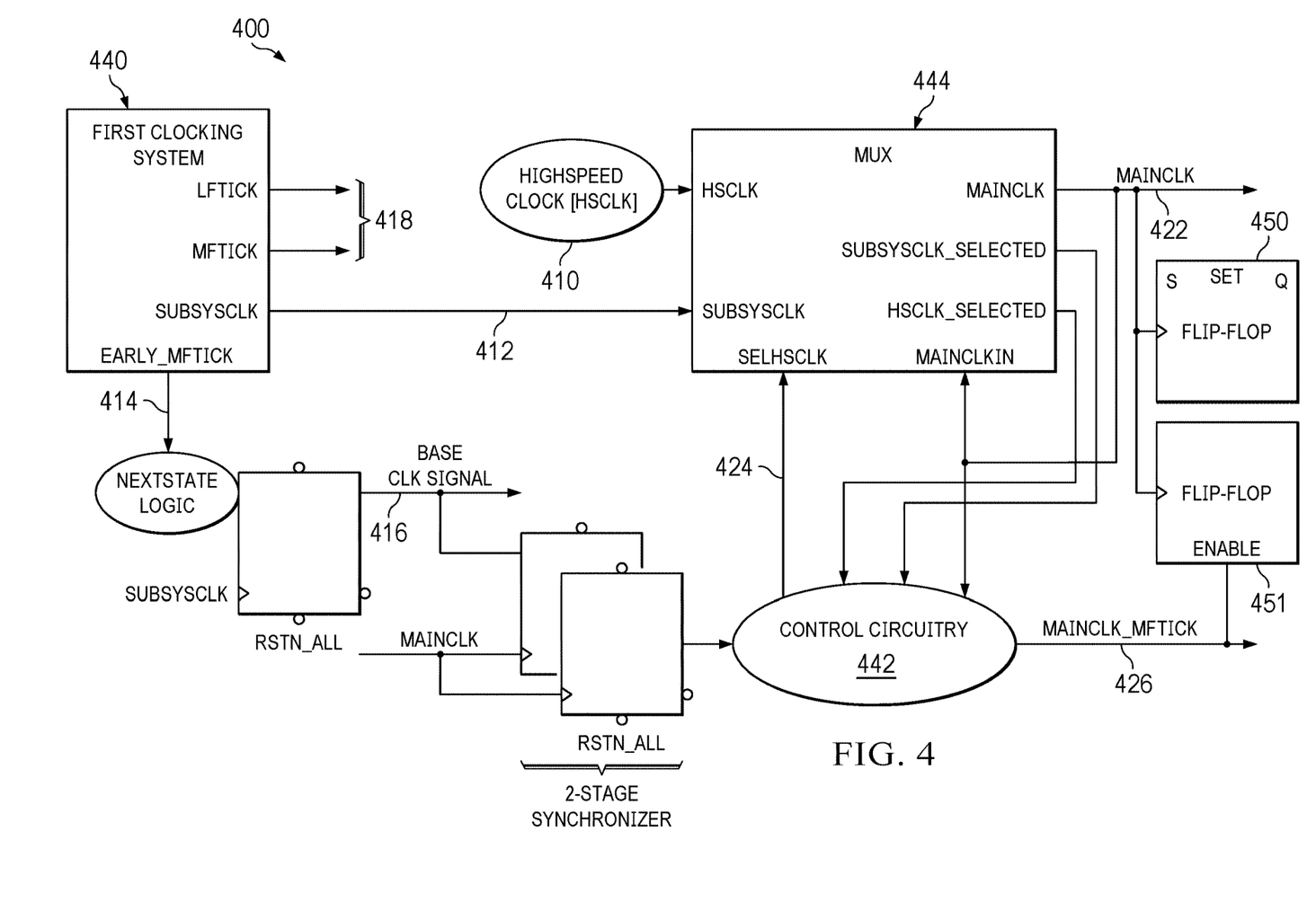
FIG. 4 illustrates a system to manage clock trigger signals across clock domains for a device according to an implementation.

FIG. 4 illustrates a system 400 to manage clock trigger signals across clock domains for a device according to an implementation. System 400 includes first clocking system 440, which may be an implementation of first clocking circuitry 110, control circuitry 442, which may be an implementation of second clocking circuitry 110 (may also include the gates and circuitry generating base clock signal 416), and MUX 444, which may be an implementation of MUX 112. System 400 further includes high speed clock (HSCLK) 410, which may be an implementation of clock signal 130, EARLY_MFTICK 414, which may be an implementation of clock trigger signal 150, SUBSYSCLK 412, which may be an implementation of clock signal 131, base clock signal 416, which may be an implementation of a duty cycle clock (e.g., 50-50 duty cycle clock) from EARLY_MFTICK 414, MFTICK 418, which is a delayed version of EARLY_MFTICK 414, MAINCLK 422, which may be an implementation of clock signal 132, SELHSCLK 424, which may be an example of selector signal 160, and MAINCLK_MFTICK 426, which may be an implementation of clock trigger signal 151. Control circuitry 442 can be implemented as a finite state machine in some examples or can be implemented using any circuitry capable of providing the operations described herein. In some implementations, control circuitry 442 includes registers, circuitry, and other elements capable of producing base clock signal 416. System 400 further includes flip-flops 450-451 that operate based on MAINCLK 422 and MAINCLK_MFTICK 426. Flip-flop 450 operates based on MAINCLK 422. Flip-flop 451 operates based on MAINCLK 422 and MAINCLK_MFTICK 426, wherein flip-flop 451 is capable of latching data (i.e., registering a clock pulse from MAINCLK 422) when MAINCLK_MFTICK 426 is in a high state.

In system 400, first clocking system 440 generates SUBSYSCLK 412, EARLY_MFTICK 414, and MFTICK 418. SUBSYSCLK 412 is representative of a selected clock signal and frequency from first clocking system 440. SUBSYSCLK 412 is generated via an oscillator available to first clocking system 440. EARLY_MFTICK 414 is used to generate base clock signal 416 that is representative of a 50-50 duty cycle of EARLY_MFTICK 414. Although not depicted in system 400, base clock signal 416 is provided to control circuitry 442.

MUX 444 receives SUBSYSCLK 412 and HSCLK 410. HSCLK 410 is representative of a second clock signal that is not available in the first time domain represented by first clocking system 440. In some implementations, HSCLK 410 is representative of a clock with a faster frequency than the frequency of SUBSYSCLK 412. In some embodiments, the HSCLK 410 frequency is greater than half the SUBSYSCLK 412 frequency, but less than three times the SUBSYSCLK 412 frequency (e.g., twice the frequency of the subsystem clock). MUX 444 is responsible for selecting a clock from HSCLK 410 and SUBSYSCLK 412 and providing the selected clock as MAINCLK 422. In some examples, the clock for MAINCLK 422 is selected via SELHSCLK 424 from control circuitry 442, wherein control circuitry 442 selects the clock based on various factors, such as a notification from a processing system or some other factor.

Control circuitry 442 generates MAINCLK_MFTICK 426 based at least in part on base clock signal 416 generated from EARLY_MFTICK 414. In generating MAINCLK_MFTICK 426, control circuitry 442 identifies a positive edge associated with base clock signal 416. In response to identifying the positive edge, control circuitry 442 identifies the next occurring period of MAINCLK 422 and transitions MAINCLK_MFTICK 426 from a low state to a high state for the duration of one period of MAINCLK 422. At the end of the period (or the next positive edge) for MAINCLK 422, control circuitry 442 returns to the low state. Control circuitry 442 then continues to monitor for the next positive edge associated with base clock signal 416 and repeats the operations associated with generating signals for MAINCLK_MFTICK 426. Accordingly, control circuitry 442 determines when to transition MAINCLK_MFTICK 426 from a low state to a high state and determines the duration for MAINCLK_MFTICK 426 in the high state is based on sampling with the MAINCLK 422. This permits peripherals to operate at a specific frequency despite the changes associated with MAINCLK 422. Additionally, synchronicity is maintained across the clock domains by using EARLY_MFTICK 414 from the first clock domain to assist in defining MAINCLK_MFTICK 426 from the second clock domain and control circuitry 442.

Figure 5:
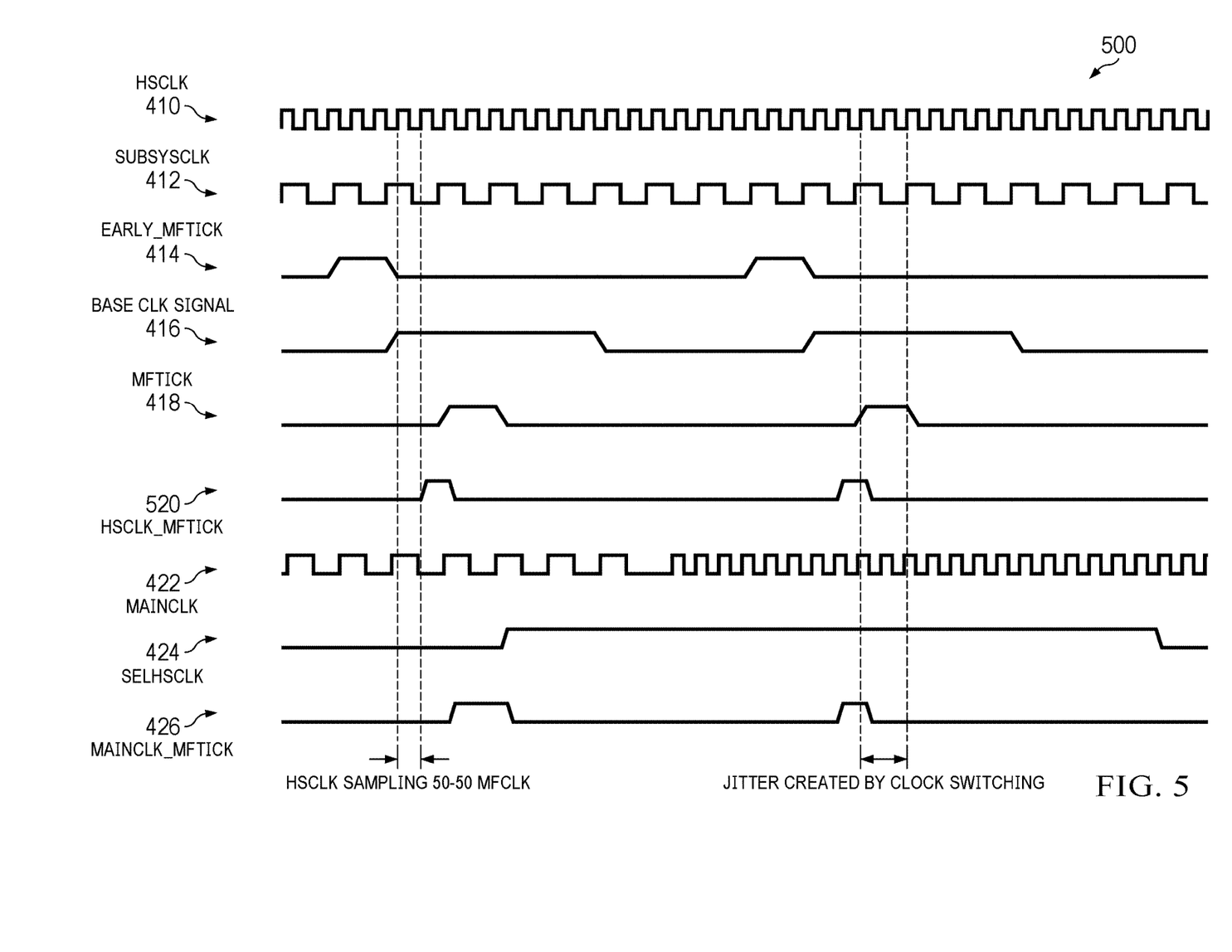
FIG. 5 illustrates a timing diagram of managing clock trigger signals across clock domains for a device according to an implementation.

FIG. 5 illustrates a timing diagram 500 of managing clock trigger signals across clock domains for a device according to an implementation. Timing diagram 500 includes HSCLK 410, SUBSYSCLK 412, EARLY_MFTICK 414, base clock signal 416, MFTICK 418, MAICLK 422, SELHSCLK 424, and MAINCLK_MFTICK 426 from system 400 of FIG. 4. Timing diagram 500 further includes HSCLK_MFTICK 520 which is representative of a signal that samples base clock signal 416 at HSCLK 410. Specifically, HSCLK_MFTICK 520 is high one period after base clock signal 416 transitions to a high state and returns to low after one period of HSCLK 410.

In timing diagram 500, HSCLK 410 is twice the frequency of SUBSYSCLK 412. SUBSYSCLK 412 is provided from a first clock domain to a MUX 444 (not pictured) in a second clock domain. HSCLK 410 is available in the second clock domain and is not received from the first clock domain. MAINCLK 422 is a selection of either HSCLK 410 or SUBSYSCLK 412 by MUX 444. During the first portion of timing diagram 500, MAINCLK 422 reflects SUBSYSCLK 412 and during the second portion of timing diagram 500, MAINCLK 422 reflects HSCLK 410. The selection of either HSCLK 410 or SUBSYSCLK 412 by MUX 444 is based on the SELHSCLK 424 signals, wherein the MAINCLK 422 is changed to the high-speed clock based on the request. The request is based on compute requirements on the device, power requirements of the device, or some other factor. For example, SELHSCLK 422 is transitioned to the high state in response to a request from a processing system for more compute resources.

EARLY_MFTICK 414 is representative of a first clock trigger signal from the first time domain. Here, EARLY_MFTICK 414 is in a high state every eighth period of SUBSYSCLK 412. Thus, EARLY_MFTICK 414 is used to indicate a desired clock signal every eight periods of SUBSYSCLK 412. From EARLY_MFTICK 414 circuitry in the second timing domain generates base clock signal 416 that is representative of a 50-50 duty cycle clock. A 50-50 duty cycle clock signal has equal durations of high and low states, with each state comprising half of the total clock period. In the example of timing diagram 500, base clock signal 416 is in a high state for four periods of SUBSYSCLK 412 and in a low state for four periods of SUBSYSCLK 412.

After base clock signal 416 is generated, the circuitry of the second clock domain (control circuitry 442 not pictured) identifies when base clock signal 416 transitions from a low state to a high state. In response to transitioning to the high state, the circuitry identifies the next positive edge or start of next period for MAINCLK 422. At the start of the next period, the circuitry transitions MAINCLK_MFTICK 426 from a low state to a high state for the duration of the period. Once the period expires, MAINCLK_MFTICK 426 is returned to a low state. MAINCLK_MFTICK 426 is provided to one or more peripherals to indicate a required rising edge of MAINCLK 422 associated with a particular frequency.

Once the MAINCLK_MFTICK 426 is returned to the low state, MAINCLK 422 is transitioned to the frequency of HSCLK 410 based on SELHSCLK 424. The circuitry in the second clock domain monitors for the next rising edge of base clock signal 416. In response to identifying the rising edge, the circuitry identifies the next rising edge of MAINCLK 422 and changes MAINCLK_MFTICK 426 from a low state to a high state for one period of MAINCLK 422 after the next rising edge of MAINCLK 422 is identified. At the expiration of the period, the circuitry returns MAINCLK_MFTICK 426 to a low state and the process is repeated at the next rising edge of base clock signal 416.

As demonstrated in the example of timing diagram 500, the duration and timing of the signals from MAINCLK_MFTICK 426 are dependent on the frequency from MAINCLK 422. Specifically, when MAINCLK 422 corresponds to SUBSYSCLK 412, the length that MAINCLK_MFTICK 426 is in the high state is longer than when MAINCLK 422 reflects HSCLK 410. Further, the timing of the transition from the low state to the high state of MAINCLK_MFTICK 426 differs based on the selection of HSCLK 410 or SUBSYSCLK 412. When MAINCLK 422 reflects SUBSYSCLK 412, the transition to the high state in MAINCLK_MFTICK 426 is later than when MAINCLK 422 reflects HSCLK 410. This is caused by the difference in period length associated with the different clock signals. However, the peripherals and systems in the device can support the jitter created by the difference in signals from MAINCLK_MFTICK 426.

Although demonstrated in the example of FIG. 5 using a 50-50 duty cycle, other duty cycle ratios can be used to provide the same functionality. In some implementations, the duty cycle ratio is sufficient for producing the second clock trigger signal (MAINCLK_MFTICK 426) by sampling the base clock signal at the main clock. In one example, when the base clock signal transitions to a high state, the circuitry identifies the next period of the main clock and transitions the MAINCLK_MFTICK 426 to a high state for at least one period of the main clock. This notifies a downstream peripheral of a required clock signal.

Figure 6:
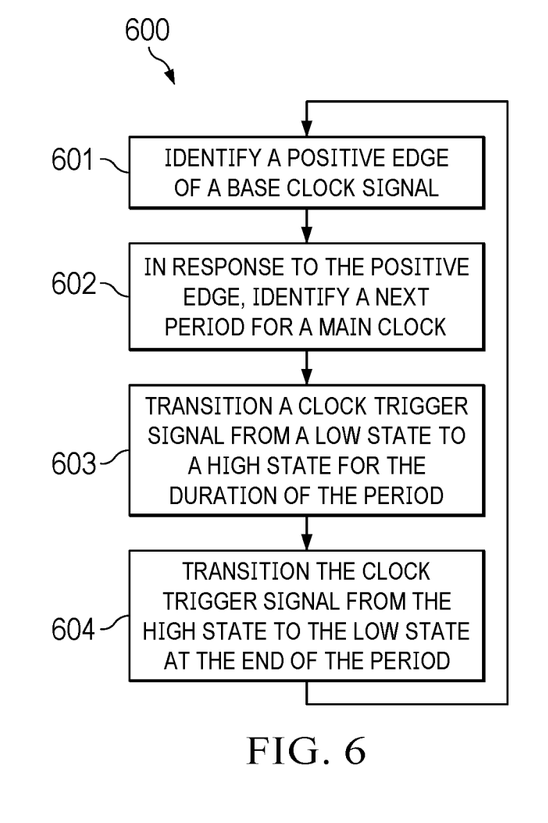
FIG. 6 illustrates a state machine diagram of managing a clock trigger signal according to an implementation.

FIG. 6 illustrates a state machine diagram 600 of managing a clock trigger signal according to an implementation. The steps of state machine diagram 600 are referenced parenthetically in the paragraphs that follow. State machine diagram 600 is performed by circuitry in a second time domain after a first time domain.

In state machine diagram 600, circuitry identifies (601) a positive edge of a base clock signal, wherein the base clock signal comprises a 50-50 duty cycle of a first clock trigger signal from the first time domain. In response to identifying the positive edge, the circuitry identifies (602) a next period for a main clock. The main clock represents a subsystem clock provided by a first subsystem in the first time domain or a second high-speed clock available in the second time domain. The selection of either clock as the main clock is provided by a MUX. Once the next period is identified for the main clock, the circuitry transitions (603) a clock trigger signal in the second time domain from a low state to a high state for the duration of the period (or at least the length of a single period, e.g. 1.5 periods). The circuitry then transitions (604) the clock trigger signal in the second time domain from the high state to the low state at the end of the period. Steps 601-604 are then repeated in generating and maintaining the clock trigger signal in the second time domain that are provided to peripherals in the second time domain. In some implementations, the base clock signal has a duty cycle ratio sufficient for producing the second clock trigger signal by sampling the base clock signal at the main clock. The sampling includes identifying the positive edge of the base clock signal, identifying the next positive edge of the main clock after identifying the positive edge of the base clock signal, and transitioning the second clock trigger signal to a high state for the length of at least one period of the main clock. Thus, the sampling the base clock signal at the main clock generates a pulse for the second clock trigger signal for a next period of the main clock after the base clock signal transitions to a high state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any portions of this application. Where the context permits, words in the above Detailed Description using the singular or plural number may also include the plural or singular number respectively. The word "or" in reference to a list of two or more items, covers all the following interpretations of the word: any of the items in the list, all the items in the list, and any combination of the items in the list.

The phrases "in some embodiments," "according to some embodiments," "in the embodiments shown," "in other embodiments," and the like generally mean the feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in an order, alternative implementations may perform routines having steps, or employ systems having blocks, in a different order, and some processes or blocks may be deleted, moved, added, subdivided, combined, and/or modified to provide alternative or sub combinations. Each of the processes or blocks may be implemented in a variety of different ways. Also, while processes or blocks are at times shown as being performed in series, the processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology considering the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method of operating a clocking system comprising:
    selecting between a first clock signal produced by a first subsystem in a first clock domain of the clocking system and a second clock signal produced by a second subsystem in a second clock domain of the clocking system to serve as a main clock signal for the second subsystem, wherein selecting between the first clock signal and the second clock signal is responsive to receiving a signal generated by the second subsystem based on current system conditions;
    deriving a base clock signal from a first clock trigger signal produced by the first subsystem, wherein a frequency of the first clock trigger signal is slower than a frequency of the first clock signal;
    generating a second clock trigger signal based on the base clock signal and the main clock signal; and
    supplying the second clock trigger signal to a second peripheral in the second clock domain.

2. The method of claim 1 further comprising supplying the first clock trigger signal to a first peripheral in the first clock domain to allow the first peripheral to operate at the frequency of the first clock trigger signal.

3. The method of claim 2 further comprising switching, via a glitchless multiplexer (MUX), the main clock signal of the second subsystem between at least the first clock signal and the second clock signal, wherein the frequency of the first clock signal is different than a frequency of the second clock signal.

4. The method of claim 3, wherein the frequency of the second clock signal is at least twice the frequency of the first clock signal.

5. The method of claim 1, wherein a duration of the second clock trigger signal is at least one period of the main clock signal.

6. The method of claim 1, wherein the base clock signal comprises a modified duty-cycle clock signal of the first clock trigger signal.

7. The method of claim 6, wherein the main clock signal includes a first rising edge between a second rising edge of the base clock signal and a falling edge of the base clock signal.

8. A clocking system comprising:
    multiplexer circuitry configured to:
    select between a first clock signal produced by a first subsystem in a first clock domain of the clocking system and a second clock signal produced by a second subsystem in a second clock domain of the clocking system to serve as a main clock signal for the second subsystem, wherein to select between the first clock signal and the second clock signal is responsive to receiving a signal generated by the second subsystem based on current system conditions;

synchronizer circuitry configured to:

derive a base clock signal from a first clock trigger signal produced by the first subsystem, wherein a frequency of the first clock trigger signal is slower than a frequency of the first clock signal;

generate a second clock trigger signal based on the base clock signal and the main clock signal; and control circuitry coupled to the synchronizer circuitry and configured to:

supply the second clock trigger signal to a second peripheral in the second clock domain.

9. The clocking system of claim 8 further comprising first clocking circuitry coupled to the synchronizer circuitry and configured to supply the first clock trigger signal.

10. The clocking system of claim 9, wherein the main clock signal is based on the frequency of the first clock signal or a frequency of the second clock signal, and wherein the frequency of the second clock signal is different from the frequency of the first clock signal.

11. The clocking system of claim 10, wherein the frequency of the second clock signal is at least twice the frequency of the first clock signal.

12. The clocking system of claim 8, wherein a width of the second clock trigger signal is equal to a period of the main clock signal.

13. The clocking system of claim 8, wherein the base clock signal comprises a modified duty-cycle clock signal of the first clock trigger signal.

14. The clocking system of claim 13, wherein the main clock signal includes a first rising edge between a second rising edge of the base clock signal and a falling edge of the base clock signal.

15. An integrated circuit comprising:

first clocking circuitry configured to produce a first clock trigger signal in a first clock domain;

multiplexer circuitry configured to:

select between a first clock signal produced in the first clock domain and a second clock signal produced in a second clock domain to serve as a main clock signal, wherein to select between the first clock signal and the second clock signal is based on current system conditions; and second clocking circuitry configured to:

derive a base clock signal from the first clock trigger signal, wherein a frequency of the first clock trigger signal is less than a frequency of the first clock signal;

generate a second clock trigger signal based on the base clock signal and the main clock signal; and supply the second clock trigger signal to a peripheral in the second clock domain.

16. The integrated circuit of claim 15, wherein the base clock signal comprises a 50-50 duty cycle and wherein producing the second clock trigger signal comprises sampling the 50-50 duty cycle at the main clock signal.

17. The integrated circuit of claim 15, wherein the main clock signal is based on the frequency of the first clock signal or a frequency of the second clock signal, and wherein the frequency of the second clock signal is different from the frequency of the first clock signal.

18. The integrated circuit of claim 17, wherein the frequency of the second clock signal is at least twice the frequency of the first clock signal.

19. The integrated circuit of claim 17, wherein the first clocking circuitry is configured to produce the first clock signal, and.

20. The integrated circuit of claim 15, wherein the peripheral comprises a universal asynchronous receiver-transmitter, an I2C device, or a serial peripheral interface (SPI) device.

* * * * *